United States Patent
Pschorn et al.

(10) Patent No.: US 9,518,358 B2
(45) Date of Patent: Dec. 13, 2016

(54) ASSEMBLY OF NOZZLES AND VALVES AS DISCHARGE PORTS OF A PRESSURIZED VESSEL AND METHOD FOR SWITCHING AND REPLACING THE NOZZLES AND VALVES

(75) Inventors: Thomas Pschorn, Sherbrooke (CA); Bertil Stromberg, Diamond Point, NY (US); Peter Mraz, Klosterneuburg (AT)

(73) Assignee: Andritz Inc., Glen Falls, NY (US)

( * ) Notice: Subject to any disclaimer, the term of this patent is extended or adjusted under 35 U.S.C. 154(b) by 1030 days.

(21) Appl. No.: 13/029,801

(22) Filed: Feb. 17, 2011

(65) Prior Publication Data
US 2012/0211512 A1   Aug. 23, 2012

(51) Int. Cl.
| | | |
|---|---|---|
| B05B 17/04 | (2006.01) | |
| D21C 7/08 | (2006.01) | |
| B01J 4/00 | (2006.01) | |

(52) U.S. Cl.
CPC .................. *D21C 7/08* (2013.01); *B01J 4/002* (2013.01); *B01J 2204/005* (2013.01)

(58) Field of Classification Search
CPC .................................. B05B 15/003; B05B 3/02
USPC ........ 239/11, 650–689; 222/1, 410; 221/277
See application file for complete search history.

(56) References Cited

U.S. PATENT DOCUMENTS

| | | | | |
|---|---|---|---|---|
| 3,579,421 A | * | 5/1971 | Richter | D21C 7/08 162/237 |
| 3,926,377 A | * | 12/1975 | Johnson | A01C 17/00 239/655 |
| 3,944,137 A | * | 3/1976 | Cutchins et al. | 239/11 |
| 4,028,171 A | * | 6/1977 | Richter | D21C 7/00 162/19 |
| 4,964,575 A | * | 10/1990 | Takata | A01M 9/003 239/655 |
| 5,262,003 A | * | 11/1993 | Chupka | D21B 1/32 162/18 |
| 5,975,996 A | * | 11/1999 | Settles | 451/102 |
| 6,202,942 B1 | * | 3/2001 | Hultgreen | A01C 23/002 137/561 A |
| 6,230,091 B1 | * | 5/2001 | McQuinn | 701/50 |
| 6,336,600 B1 | * | 1/2002 | Jessen | A01C 7/06 239/155 |
| 7,485,163 B2 | * | 2/2009 | Yoshimoto | 55/302 |
| 2004/0031864 A1 | * | 2/2004 | Johnston | 239/653 |

* cited by examiner

*Primary Examiner* — Arthur O Hall
*Assistant Examiner* — Joel Zhou
(74) *Attorney, Agent, or Firm* — Kerri A. Hochgesang; Robert Joseph Hornung

(57) ABSTRACT

A discharge assembly including: a chamber having an sidewall extending around a perimeter of the chamber, an open upper region, an flange coupling at an upper region of the sidewall and extending around the upper region and a bottom, wherein the chamber receives a rotating impeller; a plurality of discharge openings in at least one of the sidewall and bottom of the chamber; a plurality of valves each coupled to one of the discharge openings, and a plurality of nozzles each coupled to one of the discharge openings and downstream in the opening to the valve for the opening.

7 Claims, 5 Drawing Sheets

# US 9,518,358 B2

ASSEMBLY OF NOZZLES AND VALVES AS DISCHARGE PORTS OF A PRESSURIZED VESSEL AND METHOD FOR SWITCHING AND REPLACING THE NOZZLES AND VALVES

BACKGROUND OF THE INVENTION

The present invention relates to discharge ports in a pressurized vessel used to process biomass feed materials. In particular, the present invention relates to an assembly of valves and nozzles in a discharge port of a pressurized vessel.

Biomass feed material is typically processed in a vertical pressurized vessel. The feed material enters an upper inlet of the vessel, is cooked or otherwise processed in the vessel and is discharged from a port at the bottom of the vessel. The biomass feed material may be pre-treated in the vessel, such as by steaming or by hydrolysis, or the vessel may digest the biomass feed material to convert the biomass to fibers or otherwise process the biomass. In addition, the pressurized vessel may be a steaming and pressurizing device wherein the nozzle in the discharge port causes the biomass feed material to undergo steam explosion pulping.

Biomass feed material general includes one or more of cellulosic feed material, e.g., wood chips, shredded agricultural residues like straws or corn-stover, fuel energy crops like switchgrass, biomass sorghum or miscanthus, paper pulp and comminuted biomass materials. In addition, the feed material as it flows through the discharge port of the pressurized vessel may be in a slurry including cooking chemicals (which tend to be corrosive) and a large quantity of steam.

Steam explosion pulping typically involves steam used to break apart the cellulosic fiber structure (explosion pulping) of cellulosic biomass feed material. Steam explosion pulping has been used, for example, for enzyme hydrolysis. In steam explosion pulping, pulp is produced from cellulosic biomass feed material by pressurizing feed material with steam and subsequently rapidly reducing the pressure of the feed material impregnated with the steam. The rapid pressure reduction causes steam in the cells of the biomass feed material to expand and burst the cells to produce pulp. The pulp is further processed, for example, with enzymes to convert the pulp to sugars.

In steam explosion pulping, the rapid pressure reduction of the biomass feed material may be performed using a blow-valve at an outlet of a pressurized cooking vessel or conduit. Upstream of the blow-valve, the biomass feed material is pressurized to, for example, 6 bar to 25 bar, and infused with steam. Upstream of the blow-valve, the cellulosic biomass feed material may also be impregnated with chemicals, such as acids, added to a cooking reactor in which the pulp is steamed and held under pressure.

A conventional swept orifice discharge assembly includes a single ball valve or segmented ball valve connected to each discharge outlet at the bottom of a pressurized vessel. The biomass feed material flows through the ball valve and the discharge outlet directly to a blow tank. The ball valve or segmented ball valve is adjustable to control the flow of biomass feed material through the discharge outlet. The flow rate of the biomass feed material from the pressurized vessel is regulated by the ball or segmented ball valve in a conventional orifice discharge assembly.

The biomass feed material frequently contains solid material, e.g., dirt, sand and other hard particles, that wear and damage the components of an orifice discharge assembly. The ball or segmented ball valve of a conventional swept orifice discharge assembly is particularly susceptible to wear and damage from the solid material in the biomass feed material. The adjustability of the ball or segmented ball valve, the large pressure differential across the valve and the solid material in the biomass feed material cause excessive wear to the valve and result in frequent replacement of the valve.

To replace conventional ball valves and segmented ball valves requires the pressurized vessel to be shut down and the flow of biomass feed material to be temporarily stopped while the valve is replaced. In addition to the cost of lost biomass production, the cost of material and labor to replace or repair a ball or segmented ball valve is expensive. Discharge assemblies having multiple adjustable valves and nozzles have been used to provide alternative nozzles and valves for use when one nozzle and valve becomes clogged. The discharge assemblies with multiple valves and nozzles have adjustable valves with each nozzle that are prone to the same wear and damage described above. There is a long felt need for a pressurized vessel discharge assembly that is resistant to solid material in biomass feed material, may be repaired without interrupting the production of biomass feed materials, and is inexpensive to repair or replace.

BRIEF DESCRIPTION OF THE INVENTION

An assembly of valves and nozzles has been developed to replace the single ball valve and nozzle conventionally used at the discharge port of a pressurized vessel. The assembly may include multiple pairs of nozzles and valves arranged on and attached to the outer periphery (sidewall or underside) of the discharge assembly coupled to the bottom of a pressurized vessel or other conduit of biomass feed material. The valves may be conventional on-and-off valves that are more resilient to wear and less prone to damage as compared to ball or segmented ball valves. The valves may be each attached directly to a discharge port of the outer periphery of the discharge assembly. The valves may be arranged at the upstream inlet to the nozzles. The nozzles may be each attached between a valve and a conduit for directing the biomass feed material to a subsequent processing station.

The multiple nozzles may have different flow capacities, e.g., different throat diameters, such that the rate of biomass feed material flowing through each nozzle is a different rate than the rate flowing through one or more of the other nozzles. The flow rate of biomass feed material is selected by directing the biomass feed material through the nozzle having the desired flow capacity. In addition, a nozzle may be repaired or replaced by directing the biomass feed material through another nozzle and servicing the nozzle while the biomass feed material continues to flow through the other nozzle.

A valve and nozzle assembly has been conceived for a discharge assembly comprising: a plurality of discharge openings in the discharge assembly; a plurality of valves each coupled to one of the openings, and a plurality of nozzles each coupled to one of the valves within the plurality of discharge openings, wherein a first nozzle may have a greater flow capacity than a second nozzle.

A discharge assembly has been conceived including: a chamber having an sidewall extending around a perimeter of the chamber, an open upper region, an flange coupling at an upper region of the sidewall and extending around the upper region and a bottom, wherein the chamber receives a rotating impeller; a plurality of discharge openings in at least one of the sidewall and bottom of the chamber; a plurality of valves each coupled to one of the discharge openings, and a plurality of nozzles each coupled to one of the discharge openings and downstream in the opening to the valve for the opening.

A method has been conceived for discharging feed material from a discharge assembly of a pressurized vessel, the method comprising: coupling each of a plurality of valves to each of a plurality of discharge openings of the discharge assembly; coupling each of a plurality of nozzles to one of the valves, wherein the plurality of nozzles may include a first nozzle and a second nozzle having a greater flow capacity than the first nozzle; selecting the first nozzle or second nozzle based on a desired flow rate or pressure drop of the biomass feed material flowing through the discharge assembly, and, opening one of the valves corresponding to the selected first or second nozzle and closing the other valve to allow biomass feed material to flow through the open valve and selected first or second nozzle and preventing a flow of biomass feed material through the other valves. The feed material may include biomass feed material. The multiple discharge openings may be arranged at the periphery of an impeller, and the method further comprises the rotation of the impeller to move the feed material into an open discharge opening(s).

In the method, the plurality of nozzles may each have a throat having a cross-sectional area different than that of the throat of the other nozzles, and the step of selecting the first nozzle or second nozzle includes selecting a nozzle based on a desired flow rate for discharging the material.

The plurality of nozzles may each have a replaceable nozzle liner. The step of replacing the nozzle liner may be performed while feed material is discharged through another discharge openings, nozzle and valve arrangement.

DETAILED DESCRIPTION OF THE INVENTION

Figure 1:
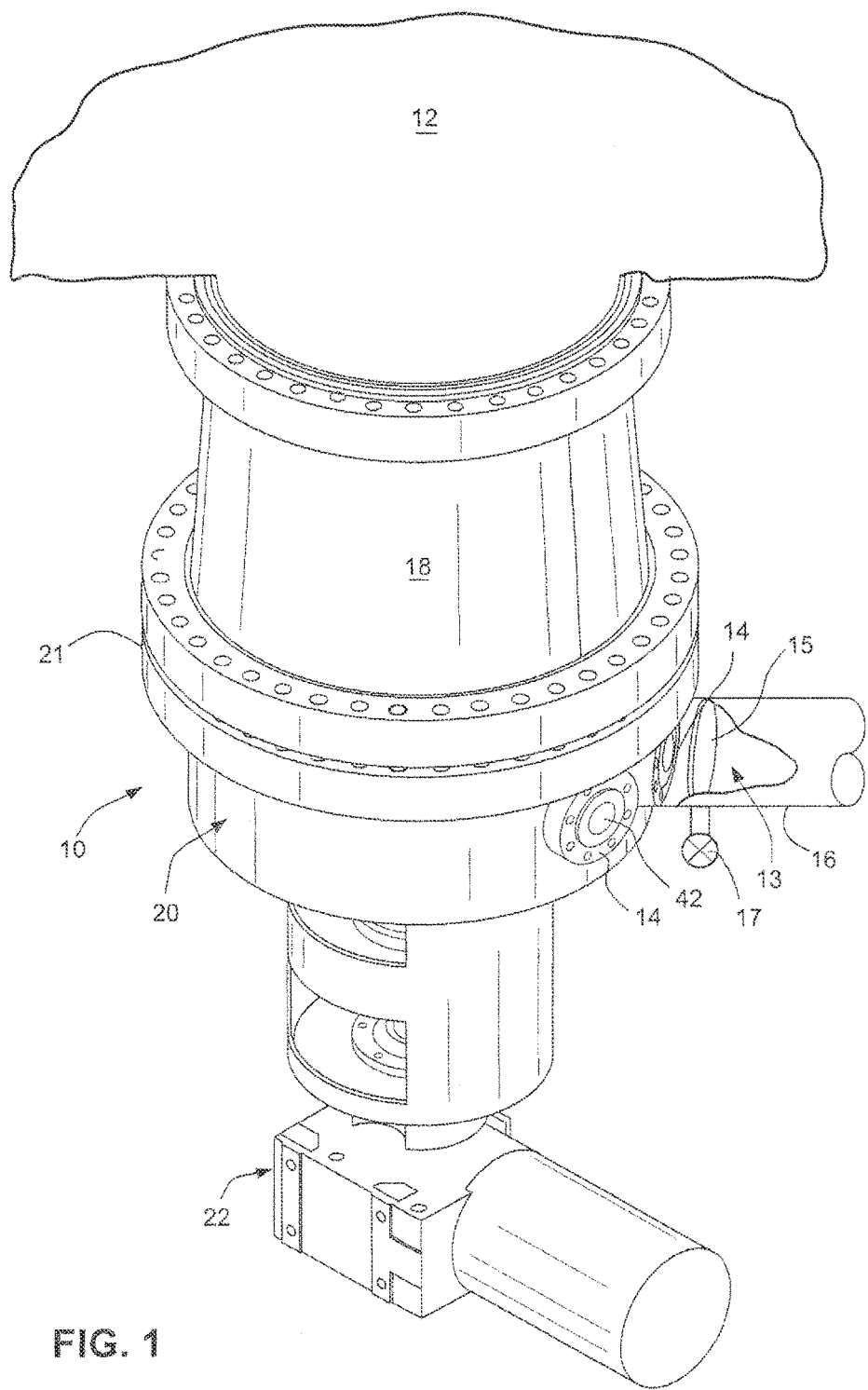
FIG. 1 is a perspective view of a bottom discharge assembly for a pressurized vessel.

FIG. 1 shows a discharge assembly 10 attached to the bottom discharge of a pressurized cylindrical vessel 12 (shown schematically), such as a chemical digester, a pretreatment vessel, pressurized cooking reactor, hydrolyzing vessel and a steam explosion device. The discharge assembly 10 includes multiple assemblies of valves 13, 43 (FIG. 3) and nozzles 14. The valves 13, 43 (FIG. 3) may each be conventional on-off valves 15 turned manually by a handle 17 or automatically by remote control of an actuator.

The valves may be upstream of the nozzles 14 (see valve 43 in FIG. 3) and, optionally, between the nozzles 14 and an inlet to a blow line 16 (valve 13 in FIG. 1). The discharge of each nozzle or valve is connected to a blow line 16, only one of which is shown in FIG. 1. The blow line 16 may be a pipe or other conduit that transports biomass feed material from the pressurized vessel 12 to a collection vessel, such as a cyclone, a blow tank or other vessel.

The discharge assembly 10 includes an upper frustoconical or cylindrical housing 18 between a bottom of the pressurized vessel 12 and an annular assembly 20 of valves and nozzles. Annular flanges 21 on the conical housing and the nozzle valve assembly are connected together by fasteners, such as bolts. A motor and gearing assembly 22 rotates an internal vertical shaft 24 that turns an impeller in the assembly 20.

Figure 2:
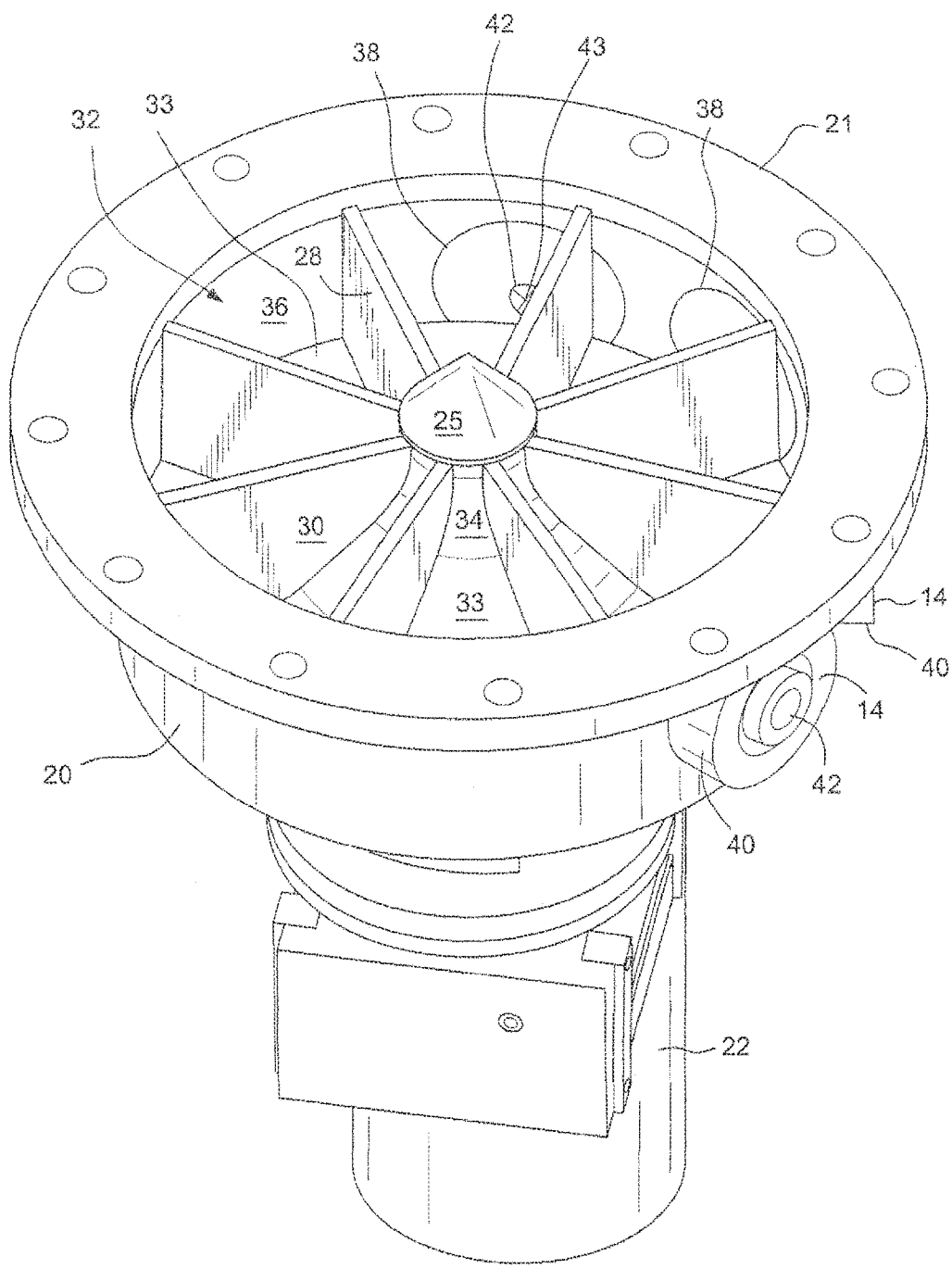
FIG. 2 is a perspective view of the discharge assembly with the interior visible of the conical housing to show the impeller.

FIG. 2 is a perspective view of a lower portion of the discharge assembly 10 with the interior visible to show the impeller 28 that is rotated by the shaft 24. The embodiment shown in FIG. 2 has a cap 25 on top of the shaft and the shaft.

The impeller 28 has radial vanes 30 that may be straight (as shown in FIG. 2), swept or otherwise shaped to move biomass material radially outward to the inlet(s) to the nozzle(s) 14 and valve(s) 13, 43 at the periphery of the wall 36. The impeller 28 is seated in an annular chamber 32 having a bottom surface 33 and an outer cylindrical wall 36 at the outer periphery of the chamber 32. The vanes 30 are attached to a collar 34 on the shaft and rotate with the shaft. The bottom edges of the vanes 30 are complementary to the bottom surface 33 of the chamber such that the vanes sweep the bottom surface as they rotate in the chamber 32.

The cylindrical outer wall 36 of the chamber 32 includes circular discharge openings 38 that extend from an inside surface of the wall facing the chamber to an outside surface of the wall. The openings 38 may by cylindrical, slightly conical or have some other shape. The openings 38 may be at the same elevation and each be symmetrically arranged at different radii of the axis of the assembly 20 of valves and nozzles.

The annular housing 40 for each pair of the valve 43 and nozzle 42 pairs may be mounted in a respective opening 38 in the wall 36. An inner axial passage through each housing 38 may receive a conical or cylindrical nozzle liner 42 that slides into and fits in the housing. The inner axial end of the housing 40 is concave and flush with the inside surface of the wall 36 of the chamber. The outer axial end of the housings 40 mates with an inlet of a valve 13 or conduit 16. The housing 40 and opening 38 may be arranged such that a lower edge of a biomass flow passage through nozzle liner 42 is adjacent the chamber bottom 33 to avoid creating a gap between the housing and bottom of the passage where abrasive or other debris can accumulate in the chamber.

Figure 3:
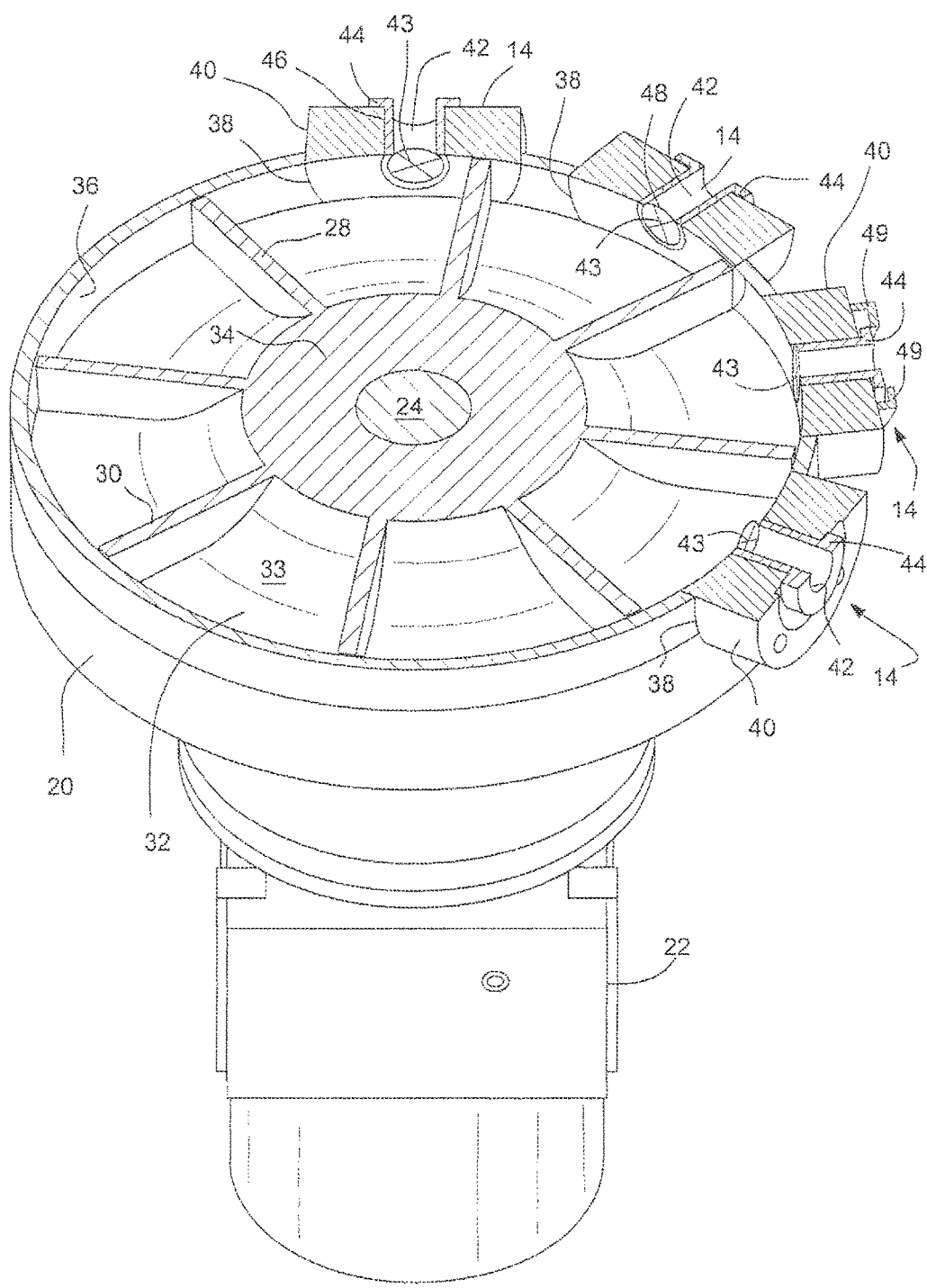
FIG. 3 is a perspective view of a cross-section of the discharge assembly showing cut-away views of a housing, valve and nozzle.

FIG. 3 is a perspective view of a cross-section of the discharge assembly showing cut-away views of the assembly 20 of valves and nozzles. The radially outer ends of the vanes of the impeller 28 sweep across the inlets to the nozzles. Valves 43 are positioned in each inlet and beyond the periphery of the impeller. These inlets are the passages in the nozzle liners 42. The sweeping movement of the impeller and the pressure in the vessel keep the biomass from becoming stagnant and plugging the nozzle. The internal pressure in the vessel forces the biomass material through the nozzle.

A nozzle flow passage extends from the inner wall 36 of the chamber, through the nozzle liner 42, and to the valve 13 and blow line 16. The flow passage allows biomass feed material from the chamber 32 to pass through the nozzle liner. As the feed material passes through the nozzle flow passage and is discharged from the passage or valve, the feed material undergoes a substantial pressure drop such that steam explosion pulping occurs.

The valve 13 is coupled to an outlet of the nozzle flow passage. The valve 13 may have a ball turret valve 15 and a stem handle 17 that is manually operated to open and close the nozzle flow passage. The inlet to the valve 13 is coupled, e.g. bolted, to the housing 40 or a flange associated with the housing 40. The outlet of the valve may be uncoupled from the blow line 16 if the valve is closed.

The nozzle liner 42 may be concentric with the nozzle flow passage and the housing 40. The nozzle liner 42 includes a throat 48 that defines a smallest area of the passage. The nozzle liner 42 may be cylindrical and include an end flange 44 that seats in an annular recess on the outer face of a housing 40. The flange 44 for the nozzle liner is affixed to the housing by, for example, clips 49 attached to the rim of the flange. The nozzle liner 42 may be removed and replaced from the housing. For example, the nozzle liner may be removed by releasing the clips holding the flange 44 and sliding the liner out of the housing in an axial direction.

The nozzle liner 42 may have a tapered outer diameter. For example, the outer diameter of the inlet end of the liner 42 may be larger than at the outlet end or vice versa. A nozzle liner 42 with a tapered outer diameter fits into a complementary tapered opening 38 in the wall. The nozzle is easily removable from the opening 38 in the housing when the flange 49 is removed and after closing the valve 43 corresponding to the nozzle liner to be replaced.

Multiple on and off valves 43, 13 and nozzles 14 allow for the redirection of the biomass production to separate collection device, such as a start-up cyclone to separate the product stream during start-up which does not meet the required product specifications.

The nozzle liner 42 may be formed of ceramic or other durable material. The nozzle liner 42 has a hard surface at the inner flow passage that provides high resistance to wear as compared to the wear resistance of ball valves and segmented valves. Further, the nozzle liners are less expensive than ball and segmented ball valves.

The passage through the nozzle liner 42 may be cylindrical, conical or have converging and diverging sections separated by a throat. The throat 48 is the narrowest or smallest cross-sectional diameter portion of the passage in the liner 42. The nozzle liner may be a laval type nozzle in which the passage is a venture having a converging and diverging sections with a throat 48 between the sections.

The internal throat 48 of one of the nozzle liners 42 may have a cross-sectional area that differs from the throat cross-sectional area of liners in the other nozzles. The differing cross-sectional areas, e.g. each throat 48 has a different diameter, provides nozzles with different flow capacities. The size and shape of the passage through the nozzle liner, e.g., the throat area, regulates the velocity and steam explosion of the biomass feed material flowing through the nozzle.

A desired flow rate, pressure drop or other condition of the biomass feed material can be achieved by selecting one of the nozzles 14 to be the discharge nozzle through which biomass feed material passes from the vessel. The valve 13 associated with the selected nozzle is turned on so that the biomass feed material flows through that nozzle. The other nozzles 14 are shut off by turning off the valves 13 associated with those nozzles.

The rapid pressure drop desired to achieve steam explosion pulping is achieved by selecting the one nozzle 14 of the plurality of nozzles that has appropriate flow capacity. Selecting the appropriate nozzle, opening the valve 13 associated with a selected nozzle 14 achieves the desired pressure drop for steam explosion pulping without the use of a conventional adjustable flow rate valve, such as a ball or segmented ball valve.

By substituting a simple on and off valve for an adjustable flow rate valve, the expensive maintenance and repair of adjustable flow rate valves is avoided. Further, steam explosion pulping may continue through one of the valve and nozzle assemblies while an unselected nozzle is repaired or replaced. The extra cost and labor associated with multiple blow lines (conduits 16) connected to the discharge assembly is favorably offset by the savings achieved by avoiding biomass feed material production losses due to repairs and avoiding the usage of ball and segmented ball valves.

The valve 43, 13 is not substantially subjected to damage and wear due to the biomass feed material and its associated pressure drop or because the valve is either fully open or fully closed. The valves 43, 13 require minimal replacement and repair because they are simple on and off valves. The valve 43 upstream of the nozzle liner 42 may be a simple on-off valve, such as a sliding door, knife gate valve, ball valve or butterfly valve. The valve 43 may be actuated manually by a control wheel or automatically by a solenoid that is remotely controlled. Closing the valve 43 shuts off flow through the nozzle and allows the nozzle liner to be repaired or replaced.

Adjustments to the discharge flow of biomass feed material from the vessel 12 is achieved by selection of the nozzle 14 used to discharge the material. If there are changes in the requirements for the pressure drop needed for steam explosion pulping or in the discharge flow of the biomass feed material, the nozzle 14 selected to be the discharge nozzle may be changed to stratify the changed requirements. Changing the selected nozzle may involve opening and closing the appropriate valves 13 and connecting and disconnecting blow lines 16. Similarly, replacing a worn nozzle may involve redirecting the flow of biomass feed material to an unused nozzle, shutting the valve for the worn nozzle and replacing the worn nozzle, without interrupting the process flow of biomass feed material.

When the biomass production is either increased or decreased further, the production is switched to another nozzle and valve assembly. This switching allows to either completely open the valve at the active discharge opening and to completely close the other openings. A partial opening valve is not required.

Figure 4:
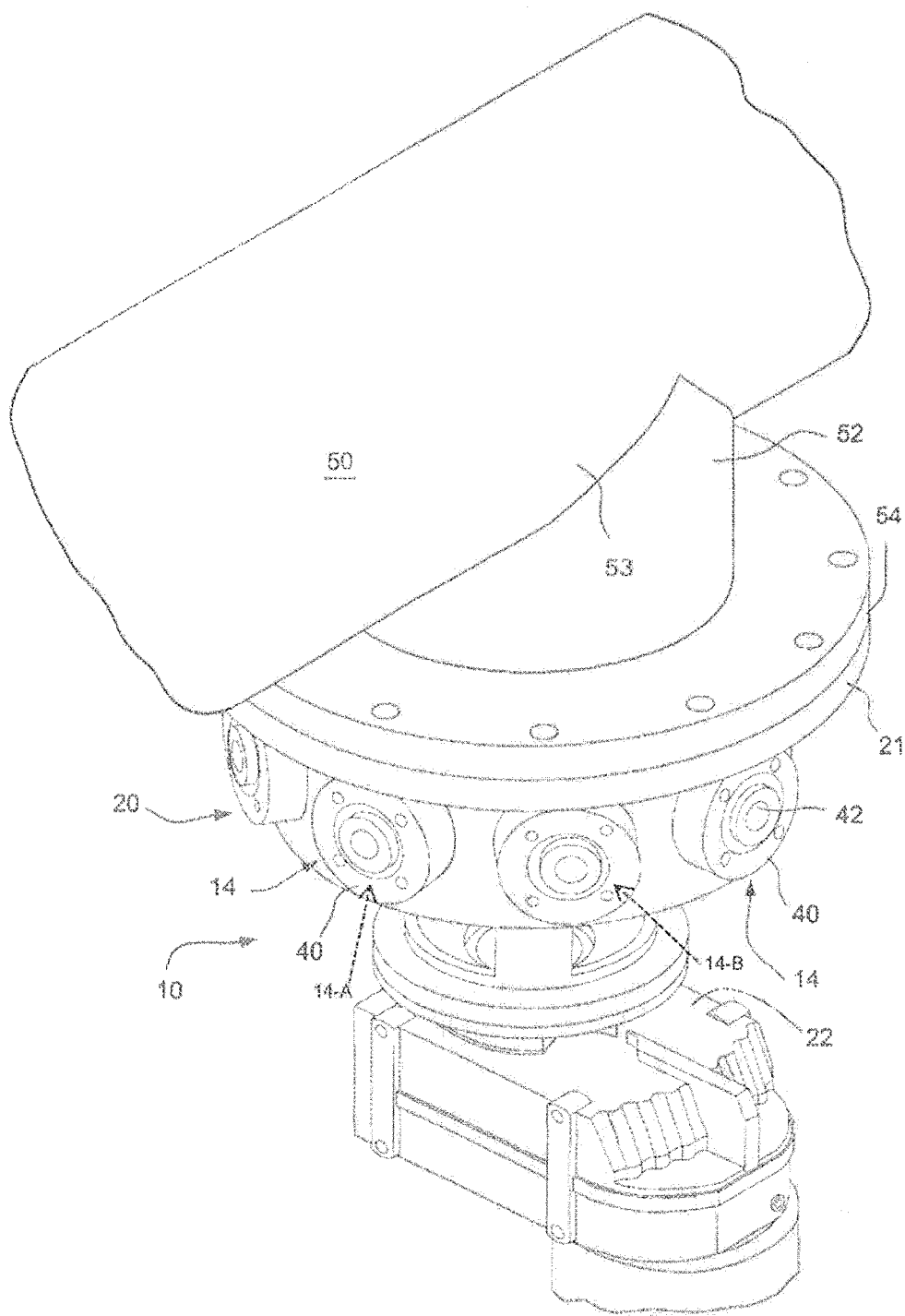
FIG. 4 is a perspective view of a discharge assembly connected to a conduit via a cylindrical coupling.

FIG. 4 is a perspective view of a discharge assembly 10 connected to a pipe conduit 50 via a cylindrical coupling 52. The conduit 50 is another example of a pressurized vessel to which the discharge assembly is connected. The cylindrical coupling includes an upper edge 53 that may be welded to an opening in the conduit 50. The coupling 52 may include a flange 54 that connects to the upper flange 21 of the assembly 20 of the discharge assembly 10. Nozzles 14 may include a first nozzle 14-A and a second nozzle 14-B having a different flow capacity different than first nozzle 14-A. First nozzle 14-A or second nozzle 14-B may be selected based on a desired flow rate or pressure drop of the biomass feed material coming from pipe conduit 50 that subsequently flows through discharge assembly 10.

Figure 5:
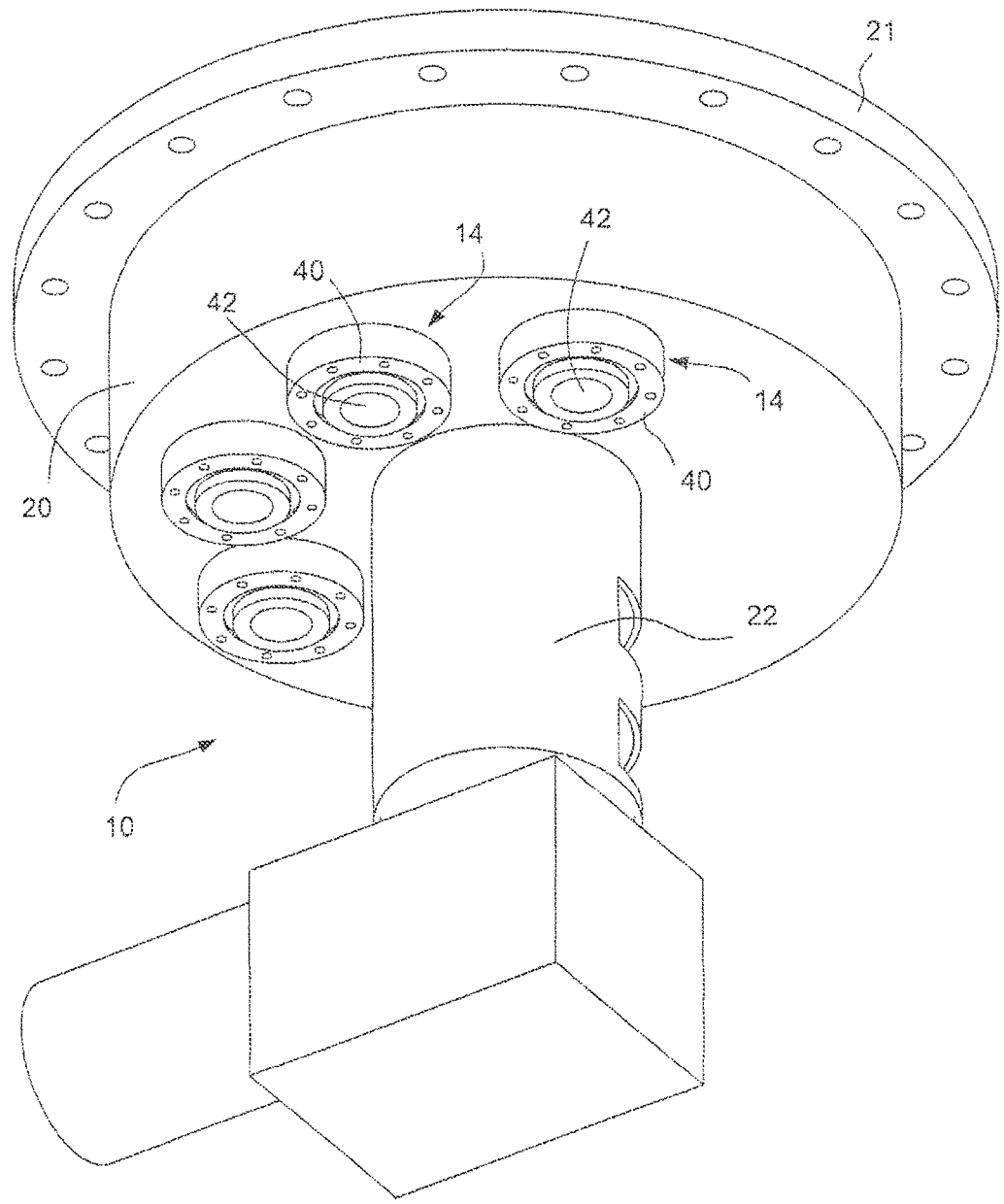
FIG. 5 is a perspective view of a discharge assembly having nozzle and valve pairs at a bottom surface of the assembly.

FIG. 5 is a perspective view of the discharge assembly 10 wherein the pairs of nozzles 14 and valves are arranged on the underside of the assembly 20 of valves and nozzles. The housing 40 for each pair of nozzle and valve is positioned on an outer surface of the housing for the assembly 20 of nozzles and valves. The outer surface may be, for example, a bottom surface as shown in FIG. 5 or a side surface as shown in FIGS. 1 to 4.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention is:

1. A discharge assembly comprising:
   a pressurized steam explosion vessel;
   a chamber at a bottom of the pressurized steam explosion vessel, the chamber having a sidewall extending around a perimeter of the chamber, an open upper region, a flange coupling at an upper region of the sidewall and extending around the upper region and a bottom;
   a plurality of discharge openings in the sidewall and the bottom of the chamber;
   a plurality of valves;
   a plurality of nozzles, wherein a nozzle is disposed in a housing coupled to one of the discharge openings, wherein the plurality of nozzles includes a first nozzle and a second nozzle having a greater flow capacity than the first nozzle; and
   a pipe disposed downstream of each nozzle, wherein each pipe and each nozzle is configured to withstand a substantial change in internal pressure, such that steam explosion occurs, wherein each valve is disposed between the nozzle and the pipe, and wherein the plurality of nozzles each have an internal flow passage with a throat having a cross-sectional area different than that of the throat of at least one of the other nozzles.

2. The discharge assembly of claim 1 wherein the valves are each an on-off valve having a full on position and a full off position, and lacking intermediate positions.

3. The discharge assembly of claim 1 wherein the plurality of nozzles each have an internal passage with a venturi shape.

4. The discharge assembly of claim 1 wherein the plurality of nozzles each have a replaceable nozzle liner.

5. The discharge assembly of claim 1 wherein the plurality of nozzles are laval type nozzles.

6. The discharge assembly of claim 1 wherein each of the openings receives an annular housing having a passage within which are mounted the valve and nozzle.

7. The discharge assembly of claim 1 wherein the chamber further comprises a rotating impeller.

* * * * *